C. H. NAULTY.
SAW SWAGE.
APPLICATION FILED AUG. 23, 1912.
1,119,628.
Patented Dec. 1, 1914.
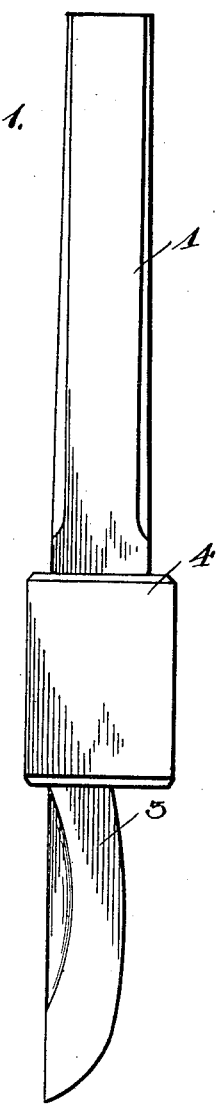
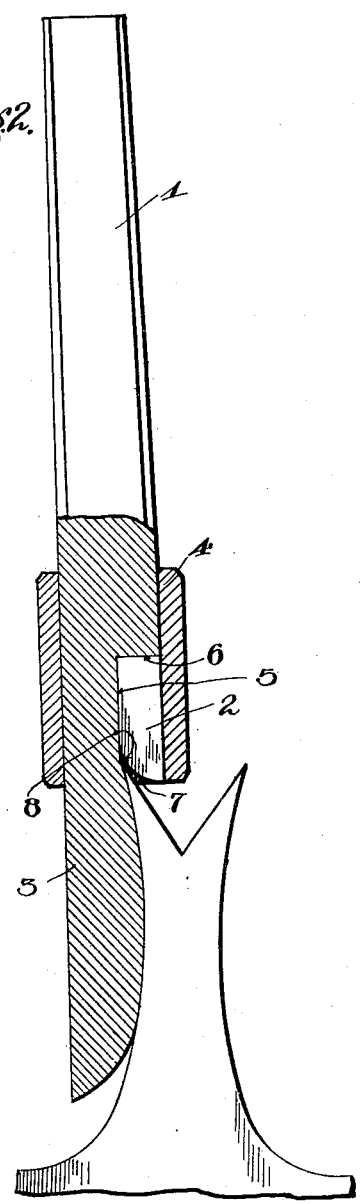
Witnesses
E. O. Upcker.
P. M. Smith.
Inventor
C. H. Naulty
By Victor J. Evans
Attorney

UNITED STATES PATENT OFFICE.

CHARLES H. NAULTY, OF JAMESTOWN, MISSISSIPPI.

SAW-SWAGE.

1,119,628.   Specification of Letters Patent.   Patented Dec. 1, 1914.

Application filed August 23, 1912. Serial No. 716,689.

*To all whom it may concern:*

Be it known that I, CHARLES H. NAULTY, a citizen of the United States, residing at Jamestown, in the county of Marion and State of Mississippi, have invented new and useful Improvements in Saw-Swages, of which the following is a specification.

This invention relates to saw swaging devices, the object in view being to provide a simple, practical, and cheap swage for operating upon the raker teeth of a cross-cut saw, in such manner as to perfectly swage the point of the tooth, without any danger whatever of injuring or improperly shaping the teeth.

With the hand saw, as with the cutting teeth of cross cut saws, the setting consists of deflecting the teeth laterally from one side to the other of the median lines so that the teeth will cut a wider kerf than the thickness of the blade and thereby prevent binding. This setting of the teeth of hand saws and the cutting teeth of cross cut saws is determined by the work in hand; the teeth requiring a greater set for use in soft wood than in hard wood. It is believed by your petitioner to be an entirely new idea to set raker teeth during the operation of swaging or in fact at any other time. The object in swaging the raker teeth is to widen the point of the tooth so that it will clear the kerf equal to the width cut by the cutting teeth. After the tooth has been swaged it is filed to sharpen the same. Unless the tooth is set by elevating its point or points so that they are in a plane with the point of the cutting teeth there is no latitude allowed for sharpening the tooth. In other words, when the tooth is swaged it is not only broadened but partially shortened and unless its point is elevated so as to allow sufficient latitude for sharpening the point of the tooth will be too low with relation to the point of the cutting teeth to perform its proper function in clearing the kerf.

In hard wood the raker teeth should be approximately one-hundredth of an inch shorter than the cutting teeth and from this relative difference there should be a change of only a thirty-second of an inch for the softest kind of wood. Now, when the cutting teeth are filed and the raker teeth swaged to correspond therewith they are frequently too low to permit of any filing or after filing are found to be too low to perform their function. Further swaging does no good and the only method known to your petitioner is by raising the point of the tooth. Applicant's tool is designed especially for this purpose which this invention has for its object.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a saw swage, embodying the present invention. Fig. 2 is a longitudinal section, also showing one of the raker teeth of a cross-cut saw in connection therewith.

The saw swaging device contemplated in this invention comprises essentially a shank 1, a die 2, a gage 3, and a die confining or retaining device 4.

The shank 1 which may be of any suitable length is provided at its lower or striking end with a longitudinally extending edge gage 3, and adjacent to the point of junction of the gage 3 with the shank 1 a recess 5 is formed, which terminates in an abrupt upper shoulder or wall 6, against which the upper end of the die 2 abuts, as clearly illustrated in the drawings. The lower face of the die is beveled and slightly curved, as shown at 7, and the upper portion of the face of the lateral edge gage 3 is also beveled on a curve, as shown at 8, there being formed in this way, between the gage and the die, a converging and laterally deflected space, in which the raker tooth is adapted to be forced when a blow is struck upon the outer or upper end of the shank. The die 2 is retained in position by means of a sleeve 4 which embraces both the die and the shank and a portion of the lateral edge gage 3, as clearly shown in Fig. 2.

In the preferred embodiment of this invention, the portion of the shank in which the die is arranged is square in cross section, and the sleeve 4 is of the same shape in cross section, so as to securely hold the die in place, and it is also preferred to permanently sweat the sleeve 4 in place, so as to prevent any possibility of the same working loose, during the operation of the swaging device. However, when the die becomes worn, or it is desired to substitute a die of slightly different shape, the sleeve 4 may be loosened and slid back, and a new die substituted.

The device as a whole will preferably be made out of tool steel, and the upper end of the shank will be hardened, as also the die, and the lateral edge gage 3. All of the parts 1, 2, 3 and 4 bear a fixed relation to each other.

In swaging one of the raker teeth, the device is placed over the extremity of the tooth, as illustrated in Fig. 2, and a light blow from a mallet or hammer is sufficient to cause the tooth to be jambed into the space between the die and edge gage, thereby imparting to the point of the tooth the necessary pitch or angularity to produce the desired results. Furthermore, each of the raker teeth is correspondingly and uniformly swaged by a single operation.

All raker teeth merge into the body of the saw on an arc and the shank of applicant's tool is provided with an extension having a cam on the curved end which when engaged with this arc or curve forces the extension away from the median line of the tooth, thereby forcing the upper end of the shank toward the median lines and raising the point of the tooth as it is swaged. The tool is not adapted to setting the cutting teeth laterally but only adapted to swage and set the points of raker teeth by elevating them. While this elevation is only in a maximum instance about a sixty-fourth of an inch it is sufficient to allow filing without lowering the points of the teeth to such a degree that they would be inoperative for clearing the kerf of the saw-dust and raising the chips separated by the cutting teeth.

What is claimed is:

A saw swage comprising a handle, a shoulder being formed upon said handle, a reduced extension being formed upon said handle, said extension being formed with a surface at right angles to said shoulder at the inner end of said extension, said extension being formed with a rounded portion merging with said aforenamed surface, a swage block arranged to bear against said shoulder and said surface rightangular to it so as to be flush with the edge of the handle, said block being formed with a rounded edge flaring away from and having a similar point of origin with said rounded portion of said extension, and a securing sleeve mounted on said handle and engaging the effective length of said block to hold it in position.

In testimony whereof I affix my signature in presence of two witnesses.

CHAS. H. NAULTY.

Witnesses:
M. D. Thomason,
K. E. Anderson.

Copies of this patent may be obtained for five cents each, by addressing the "Commissioner of Patents, Washington, D. C."